(12) United States Patent
Wang et al.

(10) Patent No.: US 11,152,796 B2
(45) Date of Patent: Oct. 19, 2021

(54) METHOD AND APPARATUS FOR UNIFORM BATTERY SYSTEM STATE OF CHARGE MANAGEMENT

(71) Applicant: WAYNE STATE UNIVERSITY, Detroit, MI (US)

(72) Inventors: Caisheng Wang, Troy, MI (US); Zuhair M. Alaas, Dearborn, MI (US); Jianfei Chen, Detroit, MI (US)

(73) Assignee: National Science Foundation, Alexandria, VA (US)

( * ) Notice: Subject to any disclaimer, the term of this patent is extended or adjusted under 35 U.S.C. 154(b) by 270 days.

(21) Appl. No.: 16/312,547

(22) PCT Filed: Jun. 22, 2017

(86) PCT No.: PCT/US2017/038668
§ 371 (c)(1),
(2) Date: Dec. 21, 2018

(87) PCT Pub. No.: WO2017/223267
PCT Pub. Date: Dec. 28, 2017

(65) Prior Publication Data
US 2020/0244076 A1 Jul. 30, 2020

Related U.S. Application Data

(60) Provisional application No. 62/354,420, filed on Jun. 24, 2016.

(51) Int. Cl.
*H02J 7/00* (2006.01)
*B60L 58/22* (2019.01)
(Continued)

(52) U.S. Cl.
CPC ............ *H02J 7/0014* (2013.01); *B60L 58/12* (2019.02); *B60L 58/22* (2019.02); *H02M 7/49* (2013.01);
(Continued)

(58) Field of Classification Search
USPC ........................................................ 320/116
See application file for complete search history.

(56) References Cited

U.S. PATENT DOCUMENTS 7,808,125 B1 * 10/2010 Sachdeva ................ H02M 7/49
307/82
10,790,738 B1 * 9/2020 Mhiesan ................. H02M 1/32
(Continued)

FOREIGN PATENT DOCUMENTS

DE 102013205562 A1 10/2014
WO WO-2011160678 A1 12/2011
(Continued)

OTHER PUBLICATIONS

Climate Change and President Obama's Action Plan 2015, Online: http://www.whitehouse.gov/climate-change.
(Continued)

*Primary Examiner* — Samuel Berhanu
(74) *Attorney, Agent, or Firm* — Fishman Stewart PLLC (57) ABSTRACT

A method and system for generating inverted electrical signals includes a first string of batteries connected in series, each battery having a half-bridge circuit connected in parallel and each having upper switch and lower switches. A first H-bridge circuit is connected in parallel with the first string of batteries, and a triangle wave generator generates a plurality of triangle wave signals at a given amplitude and carrier frequency. The plurality of triangle wave signals have individual triangle wave signals phase-shifted from one another. A modulation wave generator generates a modula-
(Continued)

tion signal at a modulation amplitude and at twice a fundamental frequency that is less than the carrier frequency. A controller compares an instantaneous magnitude of the individual triangle wave signals to an instantaneous magnitude of the modulation signal, and outputs commands to the upper switch of a respective half-bridge circuit based on the comparison.

16 Claims, 7 Drawing Sheets

(51) Int. Cl.
*B60L 58/12* (2019.01)
*H02M 7/49* (2007.01)
*H02M 7/5387* (2007.01)

(52) U.S. Cl.
CPC ..... *H02M 7/53871* (2013.01); *H02J 2207/20* (2020.01)

(56) References Cited

U.S. PATENT DOCUMENTS

| | | | |
|---|---|---|---|
| 2005/0127853 A1 | 6/2005 | Su | |
| 2014/0036557 A1* | 2/2014 | Nondahl | H02M 7/49 363/71 |
| 2015/0280542 A1* | 10/2015 | Li | H02M 3/156 323/312 |
| 2016/0268924 A1* | 9/2016 | Fu | H02M 7/483 |
| 2017/0229871 A1* | 8/2017 | Liu | H02J 3/383 |

FOREIGN PATENT DOCUMENTS

| | | |
|---|---|---|
| WO | WO-2014154495 A1 | 10/2014 |
| WO | WO-2014194968 A1 | 12/2014 |

OTHER PUBLICATIONS

Energy Storage Research and Development 2009 Progress Report http://www1.eere.energy.gov/vehiclesandfuels/resources/fcvt_reports.html.
Lezhang Liu ; Le Yi Wang; Ziqiang Chen; Caisheng Wang; Feng Lin; Hongbin Wang"Integrated System Identification and State-of-Charge Estimation of Battery Systems," *IEEE Trans. on Energy Conversion*, vol. 28, No. 1, pp. 12-23, Mar. 2013.
Maharjan, Laxman; Yamagishi, Tsukasa; Akagi, Hirofumi, "Active-Power Control of Individual Converter Cells for a Battery Energy Storege System Based on a Multilevel Cascade PWM Converter," *IEEE Trans. on Power Electronics*, vol. 27, No. 3, pp. 1099-1107, 2012.
Xiangjiang Yang ; Huirong Jiang; Zhicheng Deng, "Design of a Battery Management System Based on Matrix Switching Network," *2015 IEEE International Conference on Information and Automation (ICIA)*, pp. 138-141, 2015.
Zedong Zheng; Kui Wang; Lie Xu; Yongdong Li, "A Hybrid Cascaded Multilevel Converter for Battery Energy Management Applied in Electric Vehicles," *IEEE Trans. on Power Electronics*, vol. 29, No. 7, pp. 3537-3546, Jul. 2014.
J. Rodríguez, J.-S. Lai, and F.Z. Peng, "Multilevel Inverters: A Survey of Topologies, Controls, and Applications," *IEEE Trans. Ind. Electronic*, vol. 49, No. 4, Aug. 2002.
F. Z. Peng, "A generalized multilevel inverter topology with self-voltage balancing," *IEEE Trans. Ind. Applicat.*, vol. 37,No. 2, Mar./Apr. 2001.
J. Wen, and K. M. Smedley, "Synthesis of multilevel converters based on single and/or three-phase converter building blocks," *IEEE trans. Pow. Electronic*, vol. 23, No. 3, May 2008.
Najmi, Vahid ; Nazir, M. Nawaf; Burgos, Rolando, "A New Modeling Approach for Modular Multilevel Converter (MMC) in D-Q Frame," *Conference Proceedings—IEEE Applied Power Electronics Conference and Exposition—APEC*, vol. May 2015, No. May, p. 2710-2717, May 8, 2015.
Yasmeena ; Das, G.T.R., "A Structural & Operational Comparative Study of Converter Topologies & Analysis of MMC for High Voltage Applications," *2015 International Conference on Circuits, Power and Computing Technologies (ICCPCT)*, p. 8 pp., 2015.
Bin Wu. "Cascaded H-Bridge Multilevel Inverters" in *High Power Converters and AC Drives*. New Jersey, US: A John Wiley & Sons, Inc., 2006, pp. 119-142.
Mokhberdoran, Ataollah ; Ajami, Ali, "Symmetric and asymmetric design and implementation of new cascaded multilevel inverter topology," *IEEE Trans. on Power Electronics*, v 29, n. 12, p. 6712-6724, Dec. 2014.
M R.Banaei and E. Salary, "A new family of cascaded transformer six switches sub-multilevel inverter with several advantages," *J ElectrEng Technol*, vol. 8, No. 5, 2013.
Alaas, Z.; Caisheng Wang, "A new isolated multilevel inverter based on cascaded three-phase converter blocks," *2015 IEEE Transportation Electrification Conference and Expo (ITEC)*, p. 1-6, 2015.
Alaas, Z.; Caisheng Wang, Chenguang Jiang, Chen Duan and Le Yi Wang "A Hierarchal Cascaded Multilevel Converter for Uniform SOC Battery Management," 2016 IEEE Transportation Electrification Conference and Expo (ITEC), p. 6 pp, 2016.
Luca Tarisciotti, Pericle Zanchetta, etc. "Active DC Voltage Balancing PWM Technique for High-power Cascaded Multilevel Converters," *IEEE Trans. on Power Electronics*, v 29, n 12, p. 6712-6724, Dec. 2014.
F. Chang; Z. Zheng; Y. Li; Ling Peng,"A Two-level SOC Balance Strategy for a Novel Hybrid Energy Storage Topology," 2015 17th European Conference on Power Electronics and Applications, p. 1-10, 2015.
M. Hagiwara, R. Maeda and H. Akagi,"Negative-Sequence Reactive-Power Control by a PWM STATCOM Based on a Modular Multilevel Cascade Converter (MMCC-SDBC)" in ECCE, 2011, pp.
Chanhom, P.; Sirisukprasert, S.; Hatti, N.,"DC-link voltage optimization for SOC balancing control of a battery energy storage system based on a 7-level cascaded PWM converter" *2012 9th International Conference on Electrical Engineering/Electronics, Computer, Telecommunications and Information Technology (ECTI-CON 2012)*, p. 4 pp., 2012.
Konstantinou, Georgios S; Ciobotaru, Mihai; Agelidis, Vassilios G., "Analysis of multi-carrier PWM methods for back-to-back HVDC systems based on modular multilevel converters", IECON 2011—37th Annual Conference on IEEE Industrial Electronics Society, IEEE, Nov. 7, 2011 (Nov. 7, 2011), pp. 4391-4396, XP032105154, DOI: 10.1109/IECON.2011.6120031, ISBN: 978-1-61284-969-0.
Kandasamy, Karthik; Vilathgamuwa, D.M.; Tseng, King-Jet, "Double star chopper cell converter for battery electric vehicles with inter-module SoC balancing and fault tolerant control", IECON 2014—40th Annual Conference of the IEEE Industrial Electronics Society, IEEE, Oct. 29, 2014 (Oct. 29, 2014), pp. 2991-2996, XP032739371, DOI: 10.1109/IECON.2014.7048935 [retrieved on Feb. 24, 2015].
Nan, Li; Gao, Feng; Yang, Tingting; Zhang, Lei; Zhang, Qian; Ding, Guangqian, "An integrated electric vehicle power conversion system using modular multilevel converter", 2015 IEWE Energy Conversion Congress and Exposition (ECCE), IEEE, Sep. 20, 2015 (Sep. 20, 2015), pp. 5044-5051, XP032801307, DOI: 10.1109/ECCCE.2015.7310371 [retrieved on Oct. 27, 2015].
International Search Report and Written Opinion for PCT/US2017/038668 dated Sep. 15, 2017.

\* cited by examiner

METHOD AND APPARATUS FOR UNIFORM BATTERY SYSTEM STATE OF CHARGE MANAGEMENT

CROSS REFERENCE TO RELATED APPLICATIONS

This application claims priority to Provisional Patent Application 62/354,420 filed Jun. 24, 2016, which is hereby incorporated by reference in its entirety.

GOVERNMENT RIGHTS

This invention was made with government support under Grant ECCS-1202133 awarded by the National Science Foundation. The government has certain rights in the invention.

BACKGROUND

The United States has traditionally led global efforts to address the ever increasing demand for energy and the environmental impact issues caused by human activities related to energy production and consumption. Other nations, as well, have set ambitious standards to reduce $CO_2$ emissions globally. One promising solution to address such challenges is to electrify transportation for improved fuel efficiency. Such would reduce emissions by further implementing clean renewable energy systems for electricity generation on a large scale.

Batteries are one of the important technologies for electric drive vehicles (EDVs) that include hybrid electric vehicles (HEVs), plug-in hybrid electric vehicle (PHEVs), and battery electric vehicles (BEVs) (or "EV's" more generally). In multi-battery pack systems such as those used in EDVs and utility scale battery storage systems, the battery packs are charged and discharged with batteries connected in series to achieve a desirable high operating voltage.

However, the characteristics of various battery cells are affected by many factors such as production variations and differences in age degradation. Due to differences among different battery modules/cells, some of them are charged or discharged faster than the others in the same battery chain. The battery module/cell with a lower capacity in string is generally a weak point in the system since it is vulnerable to being overcharged or over-discharged, while battery modules/cells with higher capacity may be only partially utilized. In each charge/discharge cycle, the battery module/cell with the lowest capacity typically may get weaker and weaker until it fails, which may result in a premature failure of the whole battery system. It is then important that all battery modules/cells operate under a uniform State of Charge (SOC). Known multilevel inverters have been proposed for battery management of large battery systems including the battery systems in EDVs and grid connected large scale battery storage systems.

Multilevel cascaded inverters have been widely used in applications with medium and/or high voltage levels in general. Modular multilevel converters (MMCs) are one type of cascaded multilevel converter, characterized by a modular arm design. Modular design can be an effective means for cost reduction. The advantages of high modularity, ability for direct high voltage connection, and scalability make MMCs promising in many applications. Nevertheless, MMC converters typically have fairly large inductors to suppress the circulating current due to the voltage difference over the arm inductor. Another issue regarding this type of converter is the large number of capacitors included for each module, which can lead to a large converter size. Moreover, for applications in batteries, the battery modules in an MMC converter typically have a common DC link, which makes this topology not suitable for large battery storage systems that include power management of individual battery modules.

One known hybrid cascaded multilevel converter was proposed for battery management in electric vehicle applications. By using a multi-carrier magnitude modulation scheme, the individual battery modules/cells in an EV battery pack can be managed. However, the battery modules/cells connected in series are typically utilized differently, which decreases the system modularity. Additionally, switching devices in different half-bridge circuits may have different switching frequencies, resulting in different device conduction time periods and uneven power loss distributions. The aforementioned issues can further decrease the system modularity. Although some of the issues in the converter can be addressed by rotating of switching pattern among the switching devices, it adds the complexity to the control and circuit implementation.

In addition, it is challenging to achieve SOC balancing among phases for a uniform SOC operation of an entire system. There is therefore a need to develop a cost-effective way to achieve energy transfer among different phases. One known method includes a neutral point voltage injection method for three-phase SOC balancing. However, this may cause asymmetrical terminal quantities of the converter. A negative-sequence voltage injection method for three-phase energy balancing is also known. However, a negative-sequence voltage injection produces a negative-sequence current, resulting in unbalanced three-phase operations in terms of electrical quantities.

Thus, there is tremendous interest to improve SOC battery management.

BRIEF SUMMARY OF THE INVENTION

An electrical converter includes a first string of individual batteries connected in series, each individual battery having a half-bridge circuit connected in parallel, each half-bridge circuit including an upper switch and a lower switch, a first H-bridge circuit connected in parallel with the first string of individual batteries, a triangle wave generator that generates a plurality of triangle wave signals at a given amplitude and carrier frequency, the plurality of triangle wave signals having individual triangle wave signals phase-shifted from one another, a modulation wave generator that generates a modulation signal for each half-bridge circuit, and a controller. The controller compares an instantaneous magnitude of a respective individual triangle wave signal to an instantaneous magnitude of a respective modulation signal, outputs a first command to the upper switch of a respective half-bridge circuit if the respective comparison is positive, and a second command to the upper switch of a respective half-bridge circuit if the respective comparison is negative, determines a respective modulation index for each individual battery based on each respective modulation signal and on the respective individual triangle wave signal, and regulates an amount of power charged to and discharged from each individual battery by controlling each respective modulation index for each half-bridge circuit by effecting the respective modulation signal, each modulation index based on a state-of-charge (SOC) of each individual and respective battery.

A method of generating inverted electrical signals includes connecting a plurality of individual batteries together in series into a first string of individual batteries, connecting half-bridge circuits in parallel to each of the plurality of individual batteries, each half-bridge circuit having an upper switch and a lower switch, connecting a first H-bridge circuit in parallel with the first string of individual batteries, generating a plurality of triangle wave signals at a given amplitude and carrier frequency, each being phase-shifted from the other, and generating a modulation signal for each half-bridge circuit. The method further includes comparing an instantaneous magnitude of a respective individual triangle wave signal to an instantaneous magnitude of a respective modulation signal, outputting a first command to the upper switch of a respective half-bridge circuit if the respective comparison is positive, and a second command to the upper switch of a respective half-bridge circuit if the respective comparison is negative, determining a respective modulation index for each individual battery based on each respective modulation signal and on the respective individual triangle wave signal, and regulating an amount of power charged to and discharged from each individual battery by controlling each respective modulation index for each half-bridge circuit, which includes controlling the respective modulation signal with respect to the respective individual triangle wave signal for each individual battery, each modulation index based on a state-of-charge (SOC) of each individual and respective battery.

A non-transitory computer-readable medium tangibly embodying computer-executable instructions of a program being executable by a hardware processor of a computing device with a user interface to provide operations to generate a plurality of triangle wave signals at a given amplitude and carrier frequency, each being phase-shifted from the other, generate a modulation signal for each of a plurality of half-bridge circuits, compare an instantaneous magnitude of a respective individual triangle wave signal to an instantaneous magnitude of a respective modulation signal, output a first command to an upper switch of a half-bridge circuit if the comparison is positive, and a second command to the upper switch of a half-bridge circuit if the comparison is negative, determine a respective modulation index for individual batteries of a plurality of batteries based on a magnitude of each respective modulation signal and based on a magnitude of the respective individual triangle wave signal, and regulates an amount of power charged to and discharged from each individual battery by controlling each respective modulation index for each half-bridge circuit, and by controlling the respective modulation signal with respect to the respective individual triangle wave signal for each individual battery, each modulation index based on a state-of-charge (SOC) of each individual and respective battery. The plurality of individual batteries are connected together in series into a first string of individual batteries, and the half-bridge circuits are connected in parallel to each of the plurality of individual batteries, each half-bridge circuit having the upper switch and a lower switch, and a first H-bridge circuit is connected in parallel with the first string of individual batteries.

DETAILED DESCRIPTION

Referring now to the discussion that follows and the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive, otherwise limit, or restrict the claims to the precise forms and configurations shown in the drawings and disclosed in the following detailed description.

Disclosed is a new topology of a cascaded multilevel converter, called Hierarchal Cascaded Multilevel Converter (HCMC). The disclosed topology is a hybrid combination of both H-bridge and half-bridge converters which are cascaded at two hierarchical levels, i.e. the H-bridge level and half-bridge level. A phase-shifted pulse-width modulated (PWM) technique is disclosed to control the switching frequency and conduction time for the switching devices in the half-bridge circuits to achieve an equal utilization of battery modules/cells. The disclosed converter has the features of high voltage and high power application capability and modular design for cost reduction and reliability improvement. A uniform State of Charge (SOC) profile is achieved via the disclosed converter without adding additional balancing circuits. Furthermore, failed individual battery modules/cells can be bypassed via the converter without bringing down the whole battery system.

For large scale battery systems, cell/module balancing is important to protect the weaker batteries while fully utilizing the full capacity of the whole battery system. In the disclosed converter, a uniform SOC operation is achieved and maintained continuously by controlling individual battery modules/cells without any energy shuffling among the batteries or energy disposal.

Figure 1:
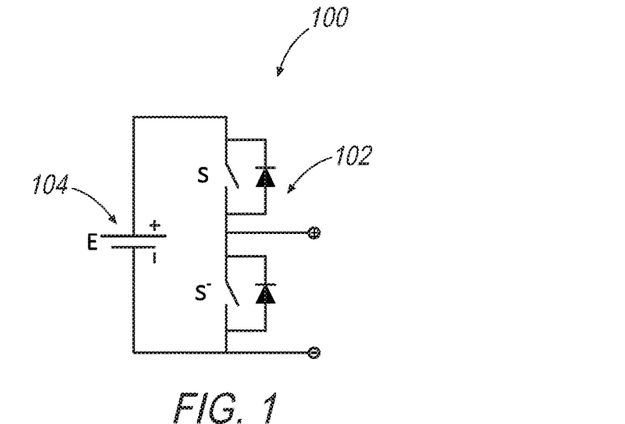
FIG. 1 illustrates a circuit that includes a half-bridge block interfaced to an individual module/cell.

To control individual battery modules/cells, a HCMC that includes half-bridge converter blocks and H-bridge blocks is disclosed. FIG. 1 shows a circuit 100 that includes a half-bridge block 102 that is interfaced to an individual module/cell 104 and manages module/cell 104. Accordingly, individual modules and cells can be managed separately through half-bridge blocks using circuit 100. Half-bridge circuits such as circuit 100 are cascaded in series and then connected to an H-bridge circuit to form a hybrid multilevel converter, as will be further illustrated.

Figure 2:
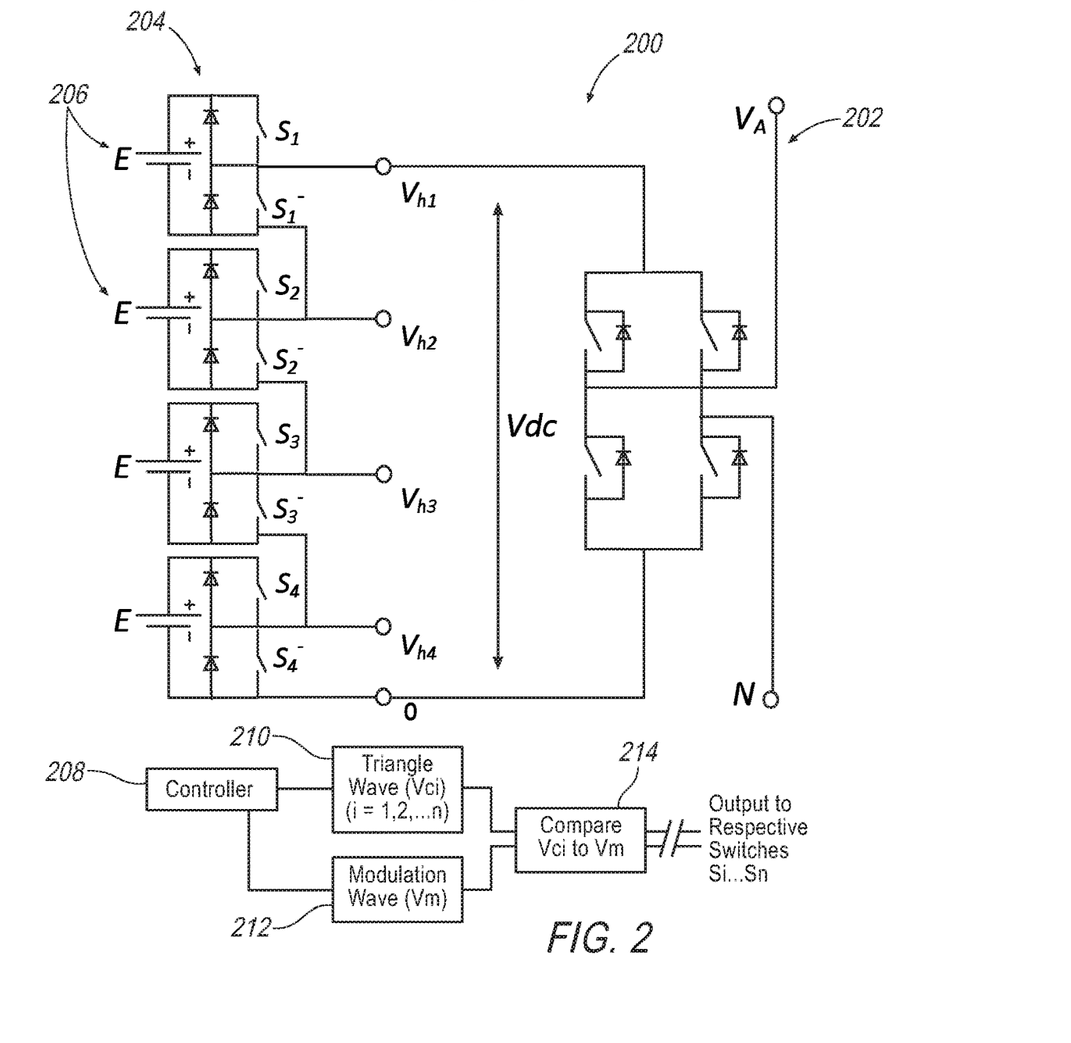
FIG. 2 illustrates an exemplary configuration of a nine-level Hierarchal Cascaded Multilevel Converter (HCMC) inverter.

FIG. 2 illustrates an exemplary inverter circuit or configuration 200 of a nine-level HCMC having only one H-bridge 202 in a single phase. H-bridge 202 in circuit 200 is used to alternate a dc link output voltage of cascaded half-bridge blocks 204, with all half-bridge blocks 204 connected in parallel to isolated individual string of batteries 206 that are connected in series. In FIG. 2, upper switches $S_1$, $S_2$, $S_3$, and $S_4$ in cascaded half-bridge blocks 204 conduct, and an output voltage of each of the half-bridge blocks is $V_{h1}=V_{h2}=V_{h3}=V_{h4}=E$. Hence, the resultant dc voltage is $Vdc=V_{h1}+V_{h2}+V_{h3}+V_{h4}=4E$. The output phase voltage of the HCMC converter is an alternating voltage switched from +4E to −4E by using H-bridge 202, which operates at a fundamental frequency of a reference signal, and is connected in parallel with string of batteries 206. The other four voltage levels of the dc link are 3E, 2E, E, and 0, which correspond to the various switching states summarized in Table I, and which likewise are switched as either positive or negative using H-bridge 202. It can be observed from Table I that some voltage levels can be obtained by more than one switching state. For example, the voltage level 2E can be produced by six sets of different switching states which provide a great flexibility for switching pattern.

In general, the number of voltage levels in a HCMC multilevel inverter can be found from Eqn. 1:

$$m=2h+1,\qquad\text{Eqn. 1,}$$

where h is the number of half-bridge cells per phase. And, although an exemplary nine-level HCMC is illustrated, it is contemplated that any number of levels of HCMC may be employed. For instance, in the basic cell (cascaded half-bridge), the number of levels is proportional to number of cascaded half-bridge converters, which is determined by the rated voltages of both battery modules and the overall output voltage that is desired. Theoretically there is no limit, but practically the number of levels may be limited by circuit components such as the DSP chip used.

The voltage level m is therefore an odd number for the HCMC multilevel inverter. Thus, in the disclosed example of FIG. 2, h is 4 and m is therefore 9. It is in the same pattern as that of traditional cascaded H-bridge (CHB) multilevel inverters while in other multilevel topologies such as diode-clamped inverters the voltage level can be either an even or odd number.

TABLE 1

| DC Link voltage | Switching State | | | | | | | |
|---|---|---|---|---|---|---|---|---|
| | $S_1$ | $S_2$ | $S_3$ | $S_4$ | $V_{h1}$ | $V_{h2}$ | $V_{h3}$ | $V_{h4}$ |
| 4 E | 1 | 1 | 1 | 1 | E | E | E | E |
| 3 E | 0 | 1 | 1 | 1 | 0 | E | E | E |
| | 1 | 0 | 1 | 1 | E | 0 | E | E |
| | 1 | 1 | 0 | 1 | E | E | 0 | E |
| | 1 | 1 | 1 | 0 | E | E | E | 0 |
| 2 E | 0 | 0 | 1 | 1 | 0 | 0 | E | E |
| | 1 | 0 | 0 | 1 | E | 0 | 0 | E |
| | 1 | 1 | 0 | 0 | E | E | 0 | 0 |
| | 1 | 0 | 1 | 0 | E | 0 | E | 0 |
| | 0 | 1 | 0 | 1 | 0 | E | 0 | E |
| | 0 | 1 | 1 | 0 | 0 | E | E | 0 |
| E | 1 | 0 | 0 | 0 | E | 0 | 0 | 0 |
| | 0 | 1 | 0 | 0 | 0 | E | 0 | 0 |
| | 0 | 0 | 1 | 0 | 0 | 0 | E | 0 |
| | 0 | 0 | 0 | 1 | 0 | 0 | 0 | E |
| 0 | 0 | 0 | 0 | 0 | 0 | 0 | 0 | 0 |

Generally, a traditional and known multilevel inverter with m voltage levels may have (m−1) triangular carriers. In contrast, the cascaded half-bridge cells in the disclosed HCMC inverter include only (m−1)/2 triangular waves, as will be further illustrated. A phase-shifted PWM modulation scheme is developed for the disclosed HCMC. By using a phase-shifted multicarrier modulation, the triangular carriers have the same frequency and the same amplitude, but with a phase shift (φ) between any two adjacent carrier waves, given by Eqn. 2:

$$\varphi = \frac{360°}{m-1},\qquad\text{Eqn. 2}$$

where m is the number of output voltage levels in the HCMC.

Figure 3:
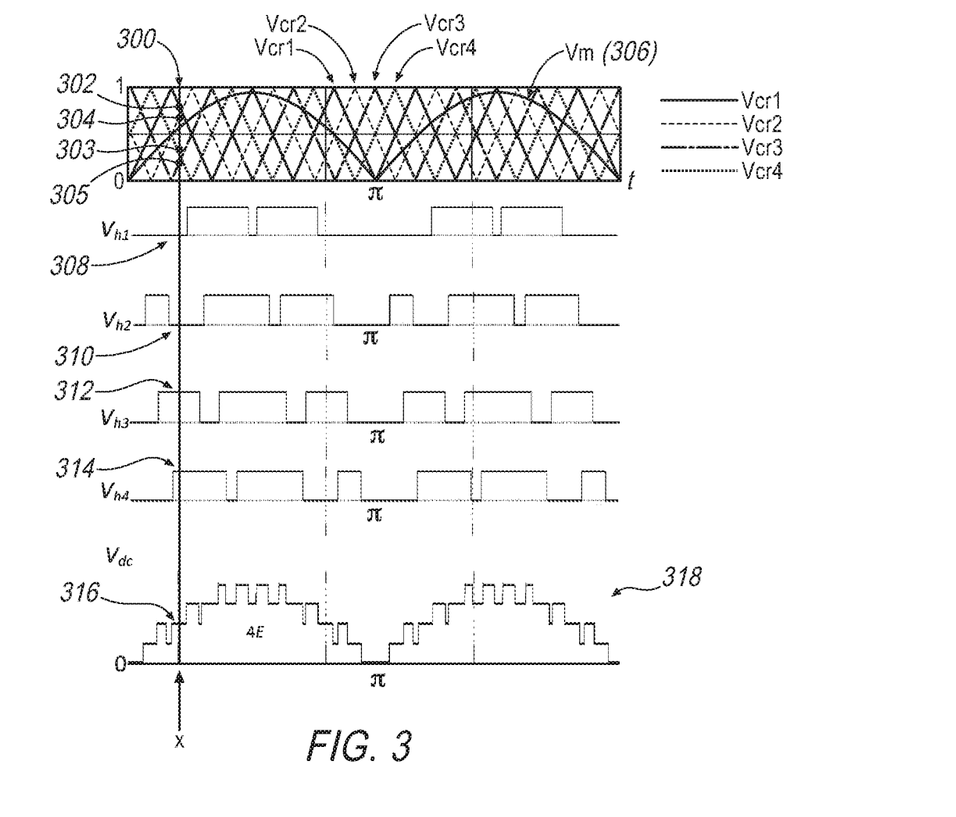
FIG. 3 illustrates a phase-shifted scheme for circuit of FIG. 2.

For the cascaded half-bridge converter blocks, a modulation signal $V_m$ is the absolute value of a reference voltage and the gate signals are generated by comparing the absolute value of the reference voltage wave with the carrier signals. FIG. 3 shows the principle of the phase-shifted scheme for circuit 200 of FIG. 2, the nine-level HCMC converter. The carrier waves $V_{cr1}$, $V_{cr2}$, $V_{cr3}$, and $V_{cr4}$ are used to generate the gate signals for the upper switches of the cascaded cells 204 in FIG. 2. The gate signals $S_1^-$, $S_2^-$, $S_3^-$, and $S_4^-$ for the lower switches in the cascaded half-bridge are not shown since these switches operate in a complementary way with respect to their corresponding upper switches. That is, for example when switch $S_1$ is closed then corresponding switch $S_1^-$ is opened.

As shown in FIG. 3, the gate signals for the upper switches $S_1$, $S_2$, $S_3$, and $S_4$ in the corresponding cascaded blocks 204 are generated by comparing $V_{cr1}$, $V_{cr2}$, $V_{cr3}$, and $V_{cr4}$ with $V_m$. Hence, the resultant voltages $V_{h1}$, $V_{h2}$, $V_{h3}$, and $V_{h3}$ are switched between zero and E during the half cycle at the fundamental frequency. The modulation index can be calculated as:

$$m_i=V_{mp}/V_{crp},\qquad\text{Eqn. 3,}$$

where $V_{mp}$ and $V_{crp}$ are the peak amplitudes of $V_m$ and $V_{cr}$, respectively.

The dc link voltage can be readily obtained as:

$$V_{dc}=V_{h1}+V_{h2}+V_{h3}+V_{h4},\qquad\text{Eqn. 4.}$$

For instance, referring still to FIG. 3, at a given phase angle "X", 300, $V_{cr1}$ and $V_{cr2}$, respectively labeled as elements 302 and 304, are above, or have a greater magnitude, than modulation signal $V_m$ 306. Since modulation signal $V_m$ is less than each of $V_{cr1}$ and $V_{cr2}$ at phase angle "X", then voltages $V_{h1}$ and $V_{h2}$ are each zero, as indicated by elements 308, 310. At the same phase angle "X", 300, modulation signal $V_m$ is greater than each of $V_{cr3}$ and $V_{cr4}$, as indicated at 303, 305, thus voltages $V_{h3}$ and $V_{h4}$ are each "E", as indicated by elements 312, 314. Accordingly, at phase angle "X", 300, $V_{dc}=0+0+E+E=2E$, as illustrated by element 316. Based on the above example at phase angle "X", 300, it is recognized that, as modulation signal $V_m$ is swept through 27, an overall pattern 318 of output results. That is, depending on the phase angle of modulation signal $V_m$, its given amplitude with respect to each of $V_{cr1}$, $V_{cr2}$, $V_{cr3}$, and $V_{cr4}$ correspondingly determines whether each of voltages $V_{h1}$, $V_{h2}$, $V_{h3}$, and $V_{h3}$ is 0 or E. Switch patterns, as discussed above, thereby result in an overall set of options that correspond with Table 1 above.

Accordingly, referring back to FIG. 2, inverter circuit 200 includes a controller 208 that is coupled to a triangle wave generator 210 and having a carrier frequency, as well as a modulation wave generator 212 for generating a modulation signal at a modulation amplitude and at twice a fundamental frequency that is less than the carrier frequency. That is, as shown in FIG. 3, modulation signal $V_m$ 306 is twice the fundamental frequency having positive amplitudes. And, as discussed above, in the example illustrated, triangle wave generator 210 in this case generates the four $V_{cr1}$, $V_{cr2}$, $V_{cr3}$, and $V_{cr4}$ with appropriate phase offsets or phase-shifts from each, each at a given amplitude and carrier frequency. Modulation wave generator 212 correspondingly generates modulation signal $V_m$, at a given amplitude and at a fundamental frequency that is less than that of the carrier frequency. A comparator circuit 214 compares each of $V_{cr1}$, $V_{cr2}$, $V_{cr3}$, and $V_{cr4}$ to modulation signal $V_m$ as described above. Each is correspondingly output to respective upper switches $S_1$, $S_2$, $S_3$, and $S_4$, with lower switches $S_1^-$, $S_2^-$, $S_3^-$, and $S_4^-$ operating in a complementary fashion, resulting in overall pattern 318 of FIG. 3. That is, by operating in a complementary fashion, when one of the switches is open, the other is closed, and vice versa.

Thus, controller 208 1) compares an instantaneous magnitude of each of the individual triangle wave signals $V_{cr1}$, $V_{cr2}$, $V_{cr3}$, and $V_{cr4}$ to an instantaneous magnitude of the modulation signal $V_m$ 306, and 2) outputs a first command to the upper switch $S_1$, $S_2$, $S_3$, and $S_4$ of a respective half-bridge circuit 206 if the respective comparison is positive, and a second command to the upper switch $S_1$, $S_2$, $S_3$, and $S_4$ of a respective half-bridge circuit 206 if the respective comparison is negative.

Also, it is contemplated that FIG. 3 is used to illustrate the concept of phase-shifted PWM modulation for the disclosed inverter. Each of the half bridge in FIG. 2, however, can be controlled to have a different modulation index so that the charging/discharging power to each individual battery cell can be controlled. Therefore, the disclosed method and apparatus work when the battery cells either have the same SOC or different SOC. When the battery cells have different SOC, power magnitudes to individual cells will be different. And, as will be further disclosed, if the battery packs in the overall three phases have overall different SOC values, then the three phase power will be different (unbalanced) as well.

Figure 4:
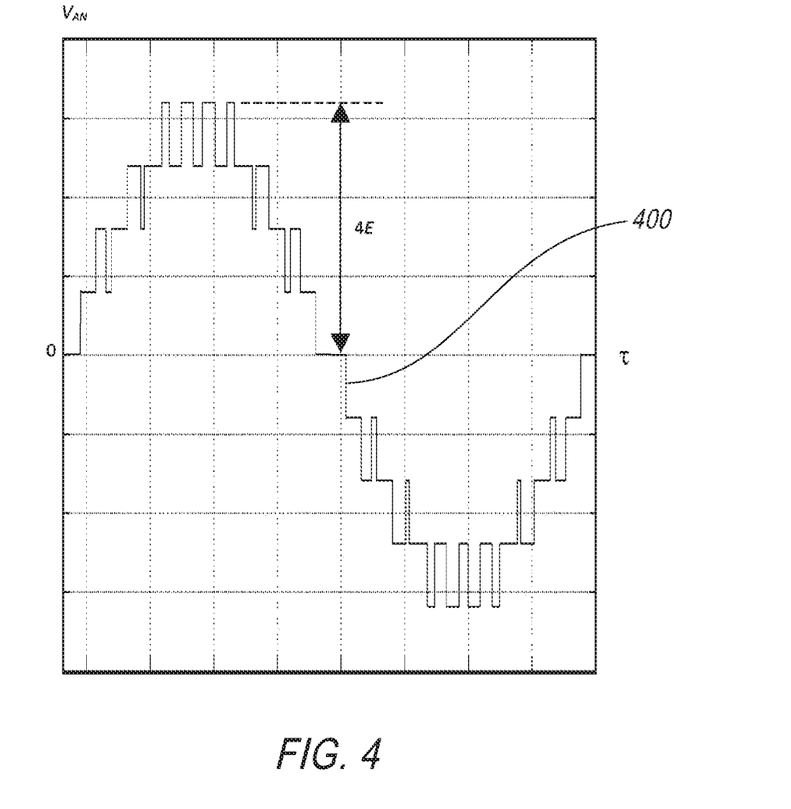
FIG. 4 illustrates an alternating dc link voltage Vdc of the circuit of FIG. 2.

As discussed, however, an H-bridge circuit is also employed to modulate the output signal to have both positive and negative portions, resulting in an approximate sinusoidal output. That is, the H-bridge circuit is used to alternate the dc link voltage Vdc as shown in FIG. 4. The output voltage signal 400 is the nine-level HCMC phase voltage under the condition, in this example, of a 60 Hz fundamental frequency $V_m$, a 180 Hz carrier frequency corresponding to each of $V_{cr1}$, $V_{cr2}$, $V_{cr3}$, and $V_{cr4}$, and a modulation index $m_i$ at 0.95. It can be clearly seen that the converter phase voltage waveform is formed by nine voltage steps: +4E, +3E, +2E, +E, 0, −E, −2E, −3E, and −4E. The magnitude of voltage step is only E during the switching between voltage levels, which leads to a low voltage stress.

Figure 5:
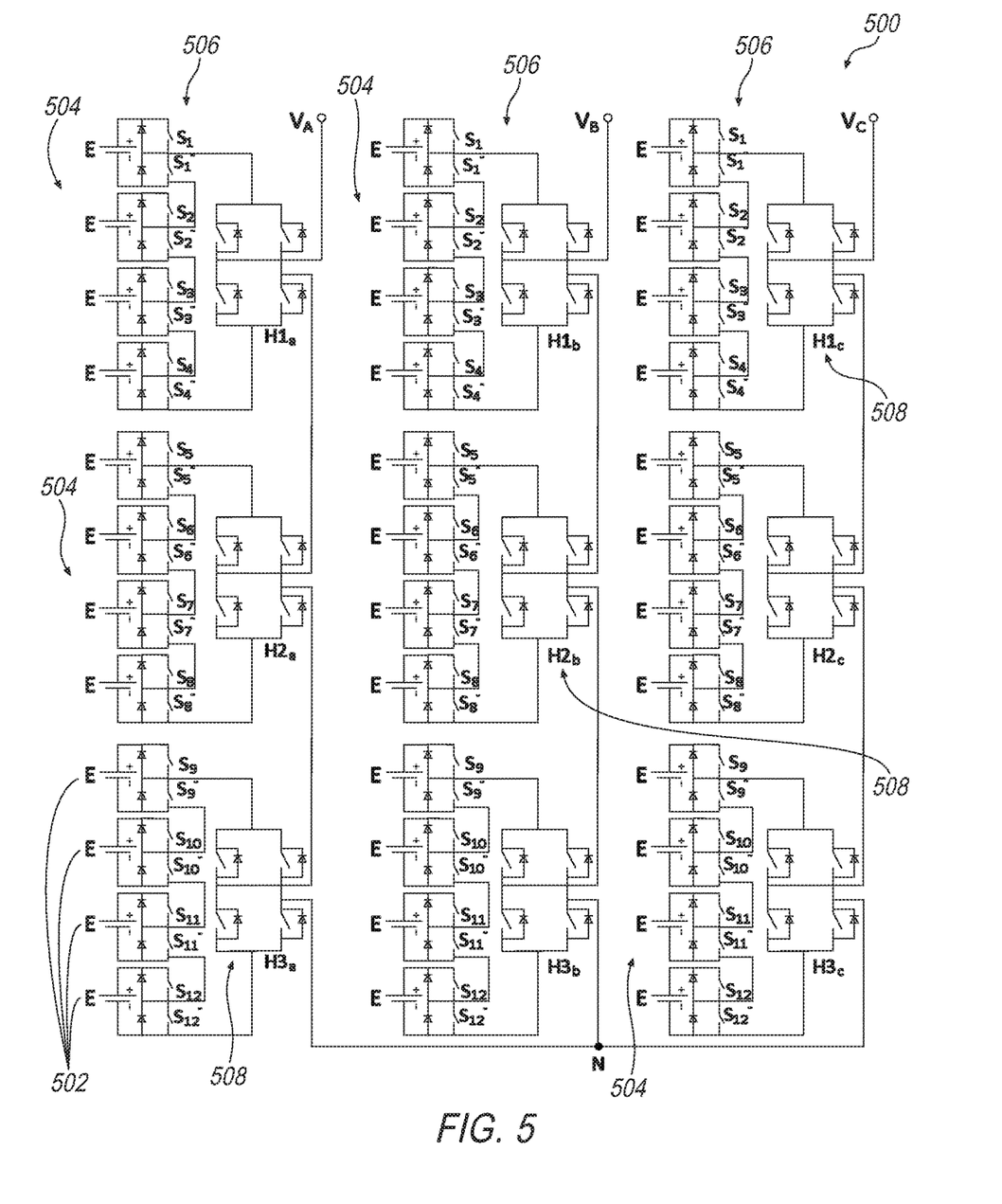
FIG. 5 illustrates an exemplary three-phase twenty five-level HCMC with two hierarchical cascaded levels.

An exemplary three-phase twenty five-level HCMC 500 is shown in FIG. 5. Illustrated are four cascaded half-bridge converters 502 in each H-bridge converter block 504 and there are 3 H-bridge converters 504 cascaded for each single phase 506. Output of the cascaded half-bridge converters 502 is connected to a dc side of each H-bridge converter 508. In this topology, each battery module/cell, such as individual batteries 206 of FIG. 2, can either produce an output voltage E, or being bypassed, which can be achieved by simply controlling the switches in each respective half-bridge converter for each battery module/cell as described above.

The charge and discharge power to each battery module/cell can be controlled by controlling the modulation index, which is discussed above. The H-bridge function is to alternate the output of the dc link to produce ac waveforms at output terminals $V_A$, $V_B$, and $V_C$. The switches in the H-bridge converters handle relatively high voltage and power levels, but are switched at a much lower frequency (i.e., the fundamental frequency). On the other hand, the switches in each half-bridge converter work under lower voltage and power and can be switched much faster. Therefore, MOSFETs can be selected as the switches for the half-bridge blocks while insulated-gate bipolar transistors (IGBTs) can be chosen for the H-bridge converter blocks in the HCMC. Compared to traditional H-bridge multilevel converters, the number of switching devices is reduced, especially for large battery systems, which simplifies control drive circuits, reduces total cost, and achieves a smaller size of converter.

The charge and discharge power control of an individual battery module/cell is achieved through the control over the half-bridge converter connected to the module/cell. That is, charge and discharge power can be regulated by controlling the modulation index $m_i$ of the switching device of each half-bridge converter, such as cascaded half-bridge blocks 204 of FIG. 2. Instantaneous charge/discharge power of the battery module/cell is given by:

$$P_{cell,i}(t) = S_{upper,i}(t) \times E_i \times I_{dc}, \quad \text{Eqn. 5,}$$

where $S_{upper,i}$ is the ith battery module/cell upper switch states: 1 is ON or 0 is OFF; $E_i$ and $I_{dc}$ are the voltage of the individual battery module/cell and the battery current of the whole string, respectively. The average power of a battery module/cell is:

$$\overline{P}_{cell,i} = m_i \times E_i \times I_{dc}, \quad \text{Eqn. 6.}$$

Hence, the charge or discharge power of each battery module/cell is controlled by regulating $m_i$ of the corresponding half-bridge converter. A continuous uniform SOC operation can be achieved in this way. For example, if a module/cell has a relatively high SOC, it can be controlled to be charged less and/or discharged more. On the other hand, for a module/cell with a relatively lower SOC, it can be controlled to be charged more and/or discharged less.

Figure 6A:
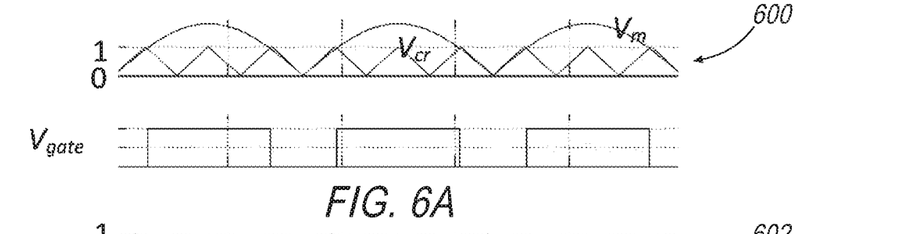
FIGS. 6(a)-(c) illustrate different cases of modulation indexes to regulate battery power and/or bypass the battery module/cell.
Figures 6B, 6C:
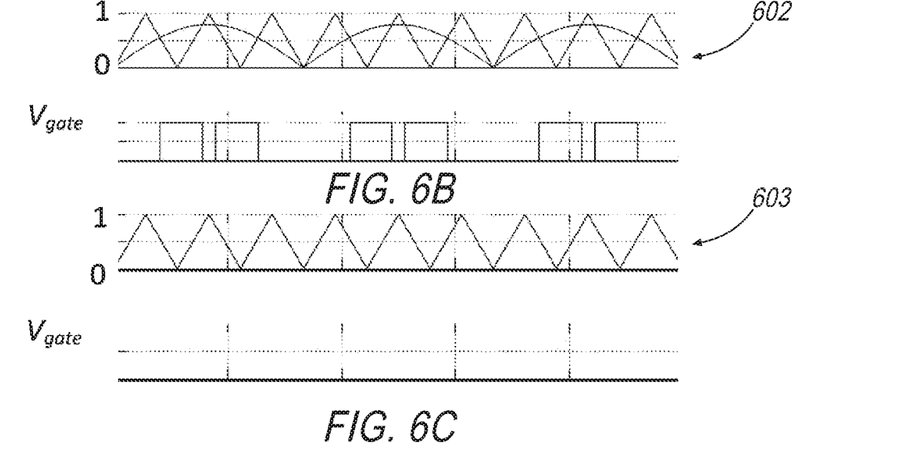

FIGS. 6(a)-(c) show different cases of $m_i$ where it is used to regulate battery power and/or bypass the battery module/cell. For example, in a discharging process, a battery module/cell with a higher SOC can be discharged more even with an over-modulated amplitude or index $m_i > 1$, shown in FIG. 6(a) 600. Other battery modules/cells with a lower SOC can be controlled to be discharged less with a lower modulation index, $0 < m_i < 1$, shown in FIG. 6(b) 602. In the charging process, a similar strategy can be carried out. When one or more modules/cells need to be bypassed, the upper switching devices of the half-bridge converters of these battery modules/cells can be turned OFF by simply applying $m_i = 0$, as shown in FIG. 6(c) 604 without affecting other modules/cells. However, in this case, the overall phase output voltage with bypassed modules/cells will be reduced. The half-bridge converters of the other healthy battery modules/cells can be controlled to generate a higher voltage to compensate this voltage drop until the damaged battery modules/cells are replaced. Nevertheless, during that period of time, the whole system may be operated at a de-rated power and energy level. Further, the SOC is measured in real time, and can be determined by actual applications for time frames such as 10 second intervals, 1 minute intervals, 10 minute intervals, etc. The modulation index (or Vm you may use) is a function of SOC.

The overall (charge or discharge) power can be regulated by controlling the overall output AC voltage, i.e. the magnitude and phase angle. The reference signal equations of the three phase system shown in FIG. 5 are given by:

$$V_A = V_{m,A}|\sin(\omega t + \beta)|,\qquad\text{Eqn. 7,}$$

$$V_B = V_{m,B}|\sin(\omega t - 120 + \beta)|,\qquad\text{Eqn. 8,}$$

$$V_C = V_{m,C}|\sin(\omega t + 120\beta)|,\qquad\text{Eqn. 9.}$$

In steady state, $V_{m,A}$, $V_{m,B}$, $V_{m,C}$ should be the same to maintain a balanced three phase system, which can done by controlling the modulation index $m_i$ for each battery module, on top of the uniform SOC management for all batteries in the strings. The energy utilization ratio can be improved while over-charge/discharge is avoided via controlling the individual battery modules/cells, as well as regulating the overall power. For example, assuming that the phase angle of the grid voltage is 0°, a positive β will bring the converter into discharge mode while a negative β will set the converter at a charge mode.

The overall power demand can be decomposed into the commands at the individual battery module/cell level as:

$$P^*_{cell,i} = \frac{P_{tot}}{N} + \Delta P_{cell,i},\qquad\text{Eqn. 10}$$

where $P_{tot}$ is the overall power demand; $P^*_{cell,i}$ is the reference value for the ith battery module/cell; N is the total number of modules/cells in the system; and $\Delta P_{cell,i}$ is the power adjustment for the uniform SOC management and $$\sum_{i=1}^{N} \Delta P_{cell,i} = 0.$$

Thus, FIG. 5 shows a first leg of batteries 506 that includes a first string of batteries connected in series with a second string of batteries 504, the second string of batteries are connected in series. The strings of batteries each have an H-bridge circuit 508 connected in parallel with a respective string 504. Respective half-bridge circuits are connected in parallel, respectively, with individual batteries in the strings of batteries. Controller 208 outputs commands to upper switches within the strings of half-bridge circuits to open and close the upper switches within the string of half-bridge circuits.

Accordingly, disclosed is a phase-shifted modulation based modular design. Phase-shifted modulation is used in the disclosed converter. Phase-shifted modulation enables the feature of modularity of the disclosed converter. That is, the switching devices in the different half-bridge circuits have the same switching frequencies, and the same device conduction times. The design includes even power loss distributions, though the switching devices can be controlled to work at different power levels. Modularity makes the system easier to implement, less costly to maintain, and more reliable to operate. In addition, high voltage and high power is achieved by hierarchical cascaded connection of smaller switching devices. The disclosed converter is cascaded at two levels: the half bridge level and the H-bridge level. The disclosed converter can be used for any voltage level (even over 110 kV) without using transformers.

That is, disclosed is a Hierarchal Cascaded Multilevel Converter (HCMC) for high voltage and high power battery systems to achieve continuous uniform SOC operation. The disclosed HCMC has a hybrid structure of half-bridge converters and H-bridge converters and the voltage can be cascaded to reach a high level at two hierarchical levels: the half-bridge level and the H-bridge level. The phase-shifted PWM modulation technique achieves the same switching frequency and conduction time for the switching devices in the half-bridge circuits to achieve an equal utilization of battery modules/cells in general. The converter has the features of high voltage and high power application capability and modular design for cost reduction and reliability improvement. Continuous uniform SOC operation is achieved via the disclosed converter without adding additional balancing circuits. Furthermore, the disclosed converter has a reconfigurable topology and an adaptive control scheme, such that failed individual battery modules/cells can be bypassed without bringing down the whole battery system. Also, individual battery modules can be managed independently on charge/discharge power, and bypass control while the overall performance requirement is also met.

Disclosed herein, also, is a three-phase SOC equalizing circuit, called six-switch energy-level balancing circuit, which can be used to realize uniform SOC operation for full utilization of the battery capacity in a three-phase battery energy storage system (BESS) while keeping balanced three-phase operation. A sinusoidal PWM modulation scheme is disclosed to control power transferring between phases in a cascaded inverter, such as that disclosed herein. Also, a phase-shifted PWM modulation technique is developed for a BESS to control the same switching frequency for switching devices.

For a large scale three-phase battery system that includes separate battery packs for individual phases, the battery packs in different phases typically, or often, have different capacities. As a result, even if a uniform SOC can be maintained for the batteries within each phase, there can be substantial SOC differences among phases, which decrease the whole system's battery utilization and the system reliability. Therefore, three-phase uniform SOC operation is important to utilize the full capacity of the whole battery system. In the disclosed circuit, a uniform three-phase balanced SOC operation is achieved for the whole system. Although the disclosed phase-to-phase balancing circuit also works for other types of cascaded inverters, the following discussion is particular to a hierarchical cascaded multilevel converter (HCMC), as discussed above.

Figure 7:
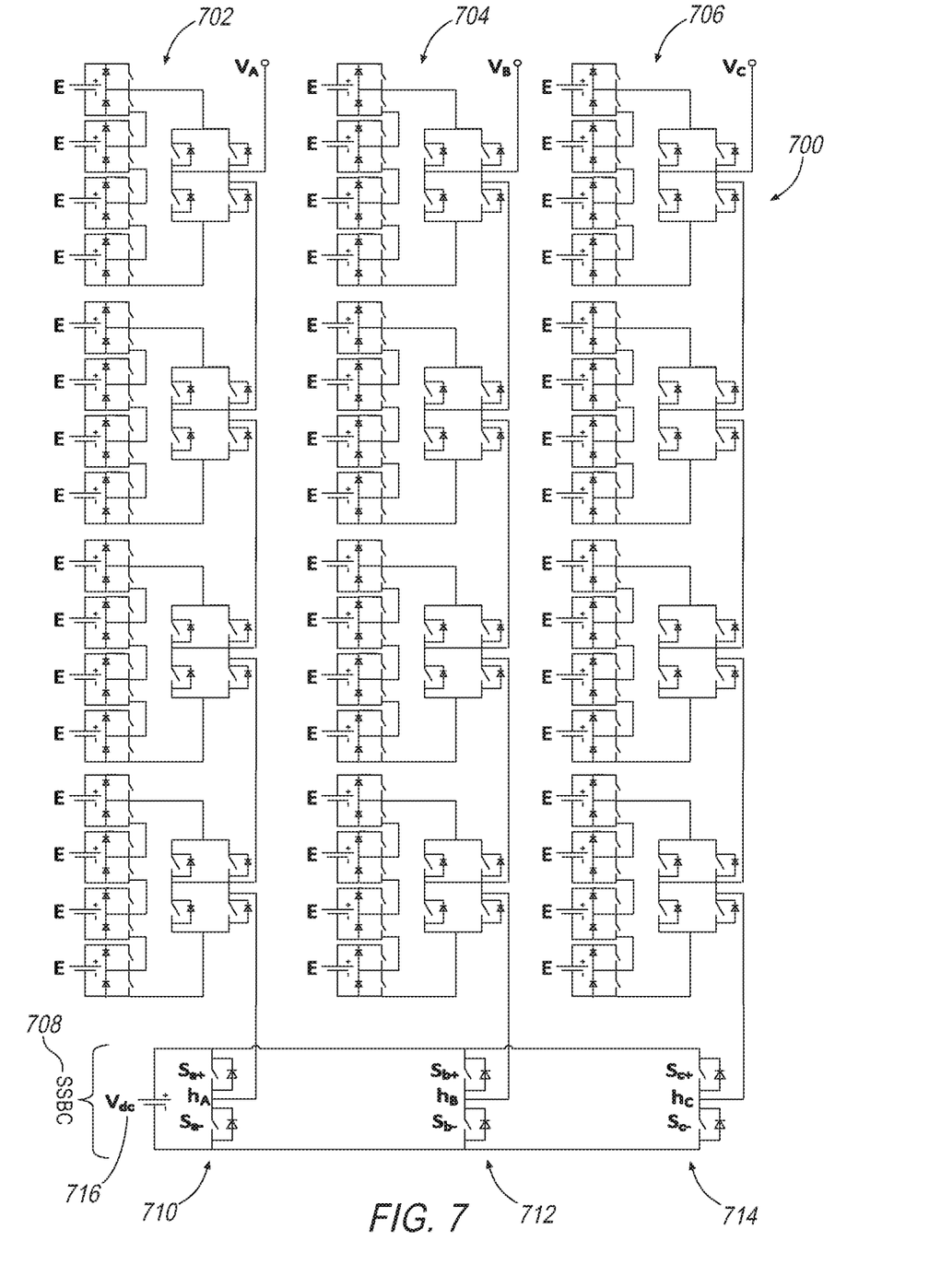
FIG. 7 illustrates a six-switch balancing circuit (SSBC) for controlling a three-phase, thirty-three level HCMC inverter.

A six-switch balancing circuit (SSBC) is disclosed, which is at the bottom level of the cascaded converter and provides a path for power transfer between the phases, shown in FIG. 7. A common battery module (i.e., a common DC source) is used in the three-phase SSBC. In addition to the capability of transferring power between phases, the disclosed SOC balancing circuit can be used as a three-phase inverter and hence a part of the HCMC to increase the system power/energy ability as needed.

The disclosed structure involves two SOC balancing levels (i.e., phase and phase-to-phase SOC balancing levels) and hence utilizes the full capacity of a BESS. To achieve a first level, the HCMC is used which includes half-bridge and H-bridge converter blocks to control power of individual battery modules/cells, as described above. FIG. 7 shows an example thirty-three level HCMC 700, with the following discussion focused on uniform SOC operations among phases 702, 704, 706, which is achieved through the disclosed SSBC circuit 708.

The three-phase circuit of SSBC 708 is realized by adding three half-bridge converters 710, 712, 714 (i.e., one half-bridge per phase) that are connected to the same common DC link 716, as shown in FIG. 7. The DC source or link 716 can be charged/discharged through the upper switching devices (i.e., $S_{a+}$, $S_{b+}$, and $S_{c+}$) in the half-bridge converters.

Moreover, the SSBC can be considered as a bottom level cascaded block in the HCMC, if needed.

Real and reactive powers delivered (under discharging) to or provided (under charging) by a grid are determined by an amplitude and angle of an output voltage of the cascaded inverter. For a given reference value of real and reactive power P and Q, the magnitude ($V_s$) and phase angle ($\beta$) of the inverter output can be obtained as:

$$V_s = \sqrt{\frac{Z^2}{U^2}(P^2+Q^2)+U^2+2PZ\cos(\theta_z)+2QZ\sin(\theta_z)}, \text{ and} \quad \text{Eqn. 11}$$

$$\beta = \theta_z - \cos^{-1}\left(\frac{ZP}{UV_s}+\frac{U}{V_s}\cos(\theta_z)\right), \quad \text{Eqn. 12}$$

where $Z=\sqrt{R_s^2+X_s^2}$, $\theta_Z=\tan^{-1}(R_s/X_s)$. $R_s+jX_s$ is the coupling impedance and the grid voltage is assumed to be $U\angle 0°$. $\beta$ will be negative when the grid charges battery.

The overall output voltage phasor ($\vec{V}_s=V_s\angle\beta$) of the HCMC inverter is realized by the control of individual battery modules/cells. The charge and discharge of an individual battery module/cell (battery module i in phase x, x=a, b, c) is achieved through the control over the half-bridge converter connected to the module/cell ($E_{i,x}$). The charge and discharge power can be regulated by controlling the modulation index $m_{i,x}$ (x=a, b, c) of the switching devices in each half-bridge converter, as shown in FIG. 7. For discharging control (delivering power back to the grid):

$$m_{i,x} = \frac{V_{sm,x}\,SOC_{i,x}}{E_{i,x}\sum_{i=1}^{N_x}SOC_{i,x}}, x=a,b,c, \quad \text{Eqn. 13}$$

where $V_{sm,x}$ is the peak value of phase x of the inverter output voltage. $E_{i,x}$ is the terminal voltage of battery module i in phase x. $N_x$ is the total number of battery modules in series for phase x.

In steady state, $V_{sm,a}$, $V_{sm,b}$, and $V_{sm,c}$ should be the same for a balanced three-phase operation while $\beta$ angle is used to regulate the overall power. For example, assuming that the phase angle of the grid voltage is 0°, a positive $\beta$ will bring the cascaded multilevel inverter into discharge mode while negative $\beta$ will set the converter at a charge mode.

For charging control, the corresponding modulation index for battery module i in phase x can be obtained in a similar way:

$$m_{i,x} = \frac{V_{sm,x}\,1-SOC_{i,x}}{E_{i,x}\sum_{i=1}^{N_x}(1-SOC_{i,x})}, x=a,b,c. \quad \text{Eqn. 14}$$

The half-bridge converters $h_a$, $h_b$, and $h_c$ in FIG. 7 are controlled based on the average SOC value of the batteries in each phase which can be given by:

$$SOC_x = \frac{1}{N}\sum_{x_i=1}^{N_x}SOC_{x_i} \quad x=a,b,c, \quad \text{Eqn. 15}$$

where $N_x$ is the total number of battery modules/cells per phase and the average SOC for the whole system can be expressed as:

$$\overline{SOC}=\tfrac{1}{3}(SOC_a+SOC_b+SOC_c), \quad \text{Eqn. 16}$$

The power of charge/discharge processes can be regulated by controlling the modulation indices $k_a$, $k_b$, and $k_c$ of the upper switching devices $S_{a+}$, $S_{b+}$, and $S_{c+}$, respectively. When the main battery system is under discharge, the modulation indices for the three half-bridge converters in the SSBC can be determined as:

$$k_x = \frac{\overline{SOC}-SOC_x}{\Delta SOC_{max}}, x=a,b,c, \quad \text{Eqn. 17}$$

where $$\Delta SOC_{max} = \max_x(SOC_x-\overline{SOC}), x=a,b,c.$$

It should be noted that the batteries in each phase are managed by the HCMC to operate at its uniform SOC, i.e., $SOC_x$, x=a, b, c, as discussed in the previous sub-section.

When the main battery system is under charge, the concept remains the same. Under this situation, the modulation indices for the three half-bridge converters in the SSBC are given as follows:

$$k_x = \frac{SOC_x-\overline{SOC}}{\Delta SOC_{max}}, x=a,b,c. \quad \text{Eqn. 18}$$

The modulation index $k_x$ for each phase leg in the SSBC can be negative. When $k_x$ is negative, the reference voltage waveform for $S_{x+}$ in the corresponding half-bridge converter (i.e., phase x in the SSBC) is 180° out of phase compared to the reference voltage for phase x in the main HCMC. On the other hand, if $k_x$ is positive, then the reference voltage waveform for $S_{x+}$ in the corresponding half-bridge converter (i.e., phase x in the SSBC) is in phase with the reference voltage for phase x in the main HCMC. For example, consider a case that the main battery system is under discharge, and $SOC_a > SOC_c > SOC_b$ and $SOC_c = \overline{SOC}$. In this case, $k_a=-1$, $k_b=1$, and $k_c=0$. The energy will be transferred from phase A to phase B until a uniform SOC is achieved for all the three phases.

Figure 8:
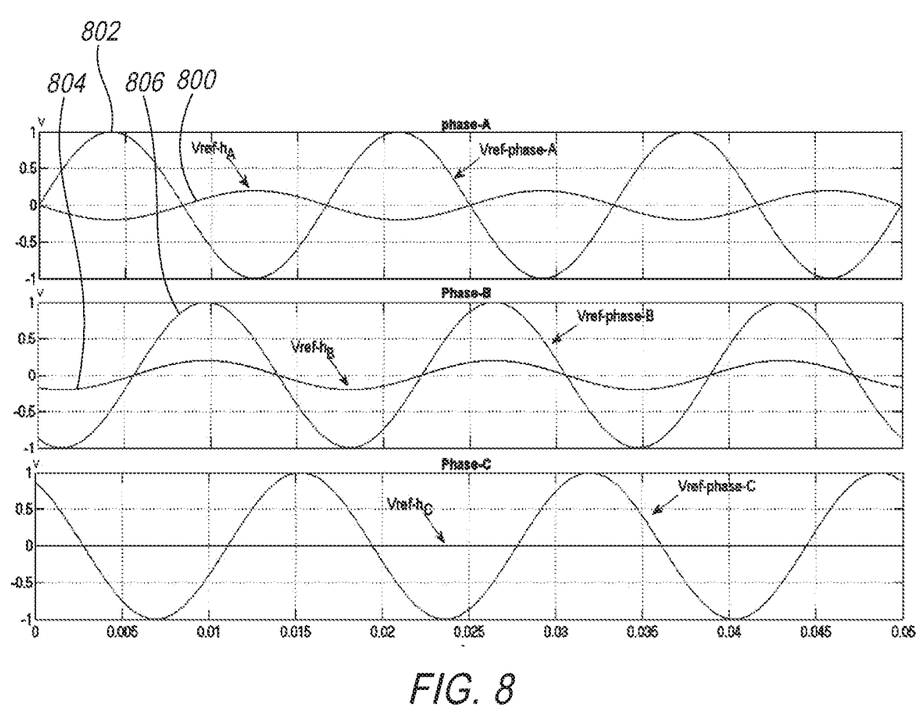
FIG. 8 shows reference voltage waveforms of the SSBC of FIG. 7.

FIG. 8 shows the reference voltage waveforms of the SSBC. It can be seen that the reference voltage waveform for $S_{a+}$ in the half-bridge converter of $h_a$ 800 is 180° out of phase from the reference voltage waveform of phase A 802 in the main HCMC. The reference voltage waveform for $S_{b+}$ in the half-bridge converter of $h_b$ 804 is in phase with the reference voltage waveform of phase B 806 in the HCMC. As a result, in addition to the regular phase power, the batteries in phase A of the main HCMC are to be discharged more by also charging the battery in the SSBC. On the other hand, the batteries in phase B of the main HCMC are to be discharged less since the battery in the SSBC is in phase with it to provide support to the phase. Note that the battery in the SSBC does not store or discharge energy in a cycle. It basically transfers the energy from phase A to phase B in the main system. This will ensure that:

$$\sum_x k_x = 0, x = a, b, c. \qquad \text{Eqn. 19}$$

The instantaneous charge/discharge power of the battery in the SSBC is given by:

$$p_{dc}(t) = (S_a(t) \times I + S_b(t) \times I + S_c(t) \times I) \times V_{dc}, \qquad \text{Eqn. 20,}$$

where $S_a$, $S_b$, and $S_c$ are the switch states of upper switches $S_{a+}$, $S_{b+}$, and $S_{c+}$, respectively. $V_{dc}$ and I are the dc source voltage and the current of each half-bridge converter in the SSBC, respectively. Thus, the average power of the SSBC is:

$$\overline{P}_{dc} = (k_a \times I + k_b \times I + k_c \times 1) \times V_{dc} = 0, \qquad \text{Eqn. 21.}$$

This disclosure includes an improved HCMC inverter topology for managing large scale battery systems with phase-to-phase SOC balancing capability. Uniform SOC operation for the whole system is achieved via a two-level SOC balancing scheme: the phase SOC balancing and phase-to-phase SOC balancing. The battery modules/cells in each phase are managed by the main HCMC inverter to operate at its uniform SOC. When the whole battery system is under unbalance of SOC among phases, the SSBC circuit can be used to transfer power between phases. In addition to the function of equalizing SOC, the disclosed energy-level balancing circuit can be used to increase the system capacity. Harmonic components can be reduced by increasing the carrier frequency of the SSBC circuit. In addition to the HCMC, the disclosed phase-to-phase balancing circuit and the corresponding control strategy can be readily used for other cascaded multilevel battery inverters to achieve phase-to-phase SOC balancing.

Computing devices such as controller 208 may include a computer that may employ any of a number of computer operating systems known to those skilled in the art, including, but by no means limited to, microprocessor systems, such as those manufactured by Motorola and Intel. The controller 208 may also employ known versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Computing devices such as the foregoing generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other tangible medium from which a computer can read.

It is intended that the scope of the present methods and apparatuses be defined by the following claims. However, it must be understood that the disclosed system may be practiced otherwise than is specifically explained and illustrated without departing from its spirit or scope. It should be understood by those skilled in the art that various alternatives to the configuration described herein may be employed in practicing the claims without departing from the spirit and scope as defined in the following claims. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples.

Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

The invention claimed is:

1. An electrical converter, comprising:
    a first string of individual batteries connected in series, each individual battery having a half-bridge circuit connected in parallel, each half-bridge circuit including an upper switch and a lower switch;
    a first H-bridge circuit connected in parallel with the first string of individual batteries;
    a triangle wave generator that generates a plurality of triangle wave signals at a given amplitude and carrier frequency, the plurality of triangle wave signals having individual triangle wave signals phase-shifted from one another;
    a modulation wave generator that generates a modulation signal for each half-bridge circuit; and
    a controller that:

compares an instantaneous magnitude of a respective individual triangle wave signal to an instantaneous magnitude of a respective modulation signal;

outputs a first command to the upper switch of a respective half-bridge circuit if the respective comparison is positive, and a second command to the upper switch of a respective half-bridge circuit if the respective comparison is negative;

determines a respective modulation index for each individual battery based on each respective modulation signal and on the respective individual triangle wave signal; and regulates an amount of power charged to and discharged from each individual battery by controlling each respective modulation index for each half-bridge circuit by effecting the respective modulation signal, each modulation index based on a state-of-charge (SOC) of each individual and respective battery.

2. The electrical inverter of claim 1, wherein one of the first and second commands is to open the respective upper switch, and the other of the first and second commands is to close the respective upper switch.

3. The electrical inverter of claim 2, wherein the upper switch and the lower switch operate complementary to one another.

4. The electrical inverter of claim 1, further comprising a first leg of individual batteries that includes the first string of individual batteries connected in series with a second string of individual batteries, the second string of individual batteries connected in series, the second string of individual batteries having a second H-bridge circuit connected in parallel and having respective second string half-bridge circuits in parallel respectively with the individual batteries within the second string of individual batteries, wherein the controller outputs commands to the upper switches within the second string half-bridge circuits to open and close the upper switches within the second string half-bridge circuits.

5. The electrical inverter of claim 4, further comprising second and third legs of batteries connected in parallel with the first leg of individual batteries.

6. A method of generating inverted electrical signals, comprising:

connecting a plurality of individual batteries together in series into a first string of individual batteries;

connecting half-bridge circuits in parallel to each of the plurality of individual batteries, each half-bridge circuit having an upper switch and a lower switch;

connecting a first H-bridge circuit in parallel with the first string of individual batteries;

generating a plurality of triangle wave signals at a given amplitude and carrier frequency, each being phase-shifted from the other;

generating a modulation signal for each half-bridge circuit;

comparing an instantaneous magnitude of a respective individual triangle wave signal to an instantaneous magnitude of a respective modulation signal;

outputting a first command to the upper switch of a respective half-bridge circuit if the respective comparison is positive, and a second command to the upper switch of a respective half-bridge circuit if the respective comparison is negative;

determining a respective modulation index for each individual battery based on each respective modulation signal and on the respective individual triangle wave signal; and regulating an amount of power charged to and discharged from each individual battery by controlling each respective modulation index for each half-bridge circuit, which includes controlling the respective modulation signal with respect to the respective individual triangle wave signal for each individual battery, each modulation index based on a state-of-charge (SOC) of each individual and respective battery.

7. The method of claim 6, wherein one of the first and second commands is to open the respective upper switch, and the other of the first and second commands is to close the respective upper switch.

8. The method of claim 7, further comprising operating the upper switch and the lower switch complementary to one another.

9. The method of claim 6, wherein each battery has a respective state-of-charge (SOC) different from one another.

10. The method of claim 9, further comprising:

connecting a second string of individual batteries in series, each having respective second string half-bridge circuits in parallel respectively with the individual batteries within the second string of individual batteries;

forming a first leg of individual batteries by connecting the first string of individual batteries in series with the second string of individual batteries;

connecting the second string of individual batteries in parallel with a second H-bridge circuit;

commanding the upper switches within the second string half-bridge circuits to open and close the upper switches within the second string half-bridge circuits.

11. The method of claim 10, further comprising connecting second and third legs of batteries in parallel with the first leg of batteries.

12. A non-transitory computer-readable medium tangibly embodying computer-executable instructions of a program being executable by a hardware processor of a computing device with a user interface to provide operations to:

generate a plurality of triangle wave signals at a given amplitude and carrier frequency, each being phase-shifted from the other;

generate a modulation signal for each of a plurality of half-bridge circuits;

compare an instantaneous magnitude of a respective individual triangle wave signal to an instantaneous magnitude of a respective modulation signal;

output a first command to an upper switch of a half-bridge circuit if the comparison is positive, and a second command to the upper switch of a half-bridge circuit if the comparison is negative;

determine a respective modulation index for individual batteries of a plurality of batteries based on a magnitude of each respective modulation signal and based on a magnitude of the respective individual triangle wave signal; and regulates an amount of power charged to and discharged from each individual battery by controlling each respective modulation index for each half-bridge circuit, and by controlling the respective modulation signal with respect to the respective individual triangle wave signal for each individual battery, each modulation index based on a state-of-charge (SOC) of each individual and respective battery;

wherein the plurality of individual batteries are connected together in series into a first string of individual batteries, and the half-bridge circuits are connected in parallel to each of the plurality of individual batteries, each half-bridge circuit having the upper switch and a lower switch, and a first H-bridge circuit is connected in parallel with the first string of individual batteries.

13. The medium of claim 12, wherein one of the first and second commands is to open the respective upper switch, and the other of the first and second commands is to close the respective upper switch.

14. The medium of claim 13, wherein the upper switch and the lower switch operate complementary to one another.

15. The medium of claim 12, wherein each battery has a respective state-of-charge (SOC) different from one another.

16. The medium of claim 12, wherein the medium outputs commands to upper switches within the second string half-bridge circuits to open and close the upper switches within the second string half-bridge circuits, wherein a first leg of batteries includes the first string of batteries connected in series with a second string of batteries, the second string of batteries connected in series, the second string of batteries having a second H-bridge circuit connected in parallel and having respective second string half-bridge circuits in parallel respectively with individual batteries within the second string of batteries.

\* \* \* \* \*